United States Patent Office 3,032,569
Patented May 1, 1962

3,032,569
PROCESS FOR THE PREPARATION OF ORGANO-
METALLIC COMPOUNDS
Donald C. Freeman, Jr., Grand Island, and Tudor L.
Thomas, Jr., Snyder, N.Y., assignors to Union Carbide
Corporation, a corporation of New York
No Drawing. Filed Apr. 9, 1956, Ser. No. 576,789
12 Claims. (Cl. 260—429)

This invention relates to a process for the production of organo-metallic compounds. More particularly, it pertains to the preparation of organo-metallic compounds which contain a transition element as the metal component and includes correlated improvements and discoveries whereby the production of such compounds is markedly enhanced.

It is a principal object of the present invention to provide an improved process for producing organo-metallic compounds containing a transition element as the metal component.

A particular object of the invention is the provision of a new and improved process for production of bis cyclopentadienyl-transition element compounds and a specific object is the provision of a process for production of bis (cyclopentadienyl)iron, bis(cyclopentadienyl)nickel and bis(cyclopentadienyl) cobalt.

Other objects of the invention will in part be obvious and will in part appear hereinafter.

Organo-metallic compounds of the type produced in accordance with the herein described invention have previously been prepared by various methods in certain of which a catalyst was utilized, and in others a reaction between a gas and a solid was involved. These procedures were attended by disadvantages, as poisoning of the catalyst, poor contact between solid and gas, poor temperature equilibration through the reaction zone, diffusion limitations on the reaction rate and removal of the product and build-up of impurities and by-products in the reaction bed as the reaction proceeds. In contradistinction thereto, the process of the present invention is non-catalytic and reaction is effected between reactants in the vapor state or in which the one reactant is in the form of vapor and another as a vapor condensate.

This invention provides a new process for the preparation of organo-metallic compounds and the resulting products have the general empirical formula $R_2M$, where R is a residue of an organic compound containing a five-carbon ring, alicyclic in character, which is hereinafter designated an "alicyclic cyclopentadienyl carbon ring" and has the structure:

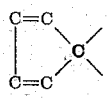

and M represents a transition element.

The alicyclic character of the carbon ring is essential for purposes of this invention. For example, cyclopentadiene and indene contain an alicyclic cyclopentadienyl ring structure; cyclopentadiene having no double bond coordinately shared with an aromatic ring, and indene having only one double bond of the cyclopentadienyl ring coordinately shared with an aromatic ring. In contrast, the five carbon ring in fluorene, where each of the double bonds in such ring is coordinately shared with an aromatic ring, is not alicyclic in character and fluorene thus does not contain an alicyclic cyclopentadienyl ring structure.

The organic compound containing the alicyclic cyclopentadienyl carbon ring desirably contains a reactive hydrogen on the methylene carbon of the alicyclic cyclopentadienyl carbon ring, but the number and character of substituents on the cyclopentadienyl carbon ring may otherwise be varied at will. Suitable organic compounds include hydrocarbon compounds having the requisite alicyclic cyclopentadienyl carbon ring.

Examples of such hydrocarbon compounds are cyclopentadiene, its aliphatic derivatives as for example methyl, ethyl, allyl and vinyl cyclopentadiene, its aromatic derivatives as for example phenyl and benzyl cyclopentadiene, indene and its comparable derivatives.

Reference herein to "transition elements" means those elements of the periodic system characterized by atoms in which an inner $d$ level of electrons is present but not filled to capacity, namely Sc, Ti, V, Cr, Mn, Fe, Co, Ni, Y, Zr, Nb, Mo, Tc, Ru, Rh, Pd, La, Hf, Ta, W, Re, Os, Ir, Pt, and Ac, as well as the so-called inner transition elements comprising the rare earth or lanthanide and the actinide series.

The invention is particularly well adapted to production of organo-metallic compounds of the type described in which M in the above empirical formula is a transition element of the fourth period, viz., those elements having an atomic number 21–28 inclusive, namely Sc, Ti, V, Cr, Mn, Fe, Co, and Ni. This group of the transition elements is characterized by having an inner $3d$ level which is partially occupied but is not filled to capacity. Consequently, this group of the transition elements may be designated the $3d$ orbital series of transition elements. Moreover, the invention is especially well adapted for the production of the described organo-metallic compounds in which the metal constituent is selected from the group consisting of iron, cobalt and nickel.

The transition elements to which this invention is applicable have a valence of 2 or more and some are polyvalent. The metal may be utilized in either a higher or lower state of oxidation. It is often preferred to employ it in a lower state of oxidation, and especially when conservation of reactants may thereby be effected.

The improved process of this invention involves vaporizing an organic compound containing an alicyclic cyclopentadienyl carbon ring, vaporizing a vaporizable halide of a transition element, commingling produced vapors thereof at reaction temperatures between about 150° C. and 600° C., with ensuing reaction and formation of an organo-transition element compound.

Furthermore, the process of the invention entails heating the metal halide, e.g., the chlorides, bromides and iodides of iron, cobalt and nickel to vaporizing temperature; conducting the vaporized metal halide in a carrier gas stream into a reaction zone; vaporizing a cyclopentadienyl compound, such as cyclopentadiene, suitably also in a carrier gas stream, commingling vapors thereof in the reaction zone, and recovering produced cyclopentadienyl metal compound, which may be effected by collecting the compound in a suitable filter or in a solvent scrubbing system. Thus, by way of example, ferrous chloride may be vaporized by heating to a temperature from about 700° to about 875° C. in a stream of argon as a carrier gas, and the vaporized ferrous chloride conducted into a reaction zone into which vaporized cyclopentadiene is introduced in a stream of argon as carrier gas, and reaction between the vapors so produced effected at a temperature from about 300° C. to about 560° C. The vaporization of the cyclopentadiene may be brought about by heating, or preferably, by bubbling the carrier gas through the cyclopentadiene at room temperature.

Further, it is desirable that the carrier gas be inert with respect both to the metal halide and the cyclopentadienyl compound. While the inertness of the carrier gas is a prerequisite for the cyclopentadienyl component, nevertheless, it need not be completely inert with respect to the metal halide vapors as long as the vapors being conducted into the reaction zone are capable of reacting with the cyclopentadienyl compound. Moreover, it has been found that the flow of the carrier gas may be varied, thus, for example, with a one-inch I.D. tube reactor it may be from 4–12 c.f.h. for the halide and from 1–8 c.f.h. for the alicyclic compound. It will be realized that other carrier gases than argon may be utilized, such as nitrogen, helium, neon and krypton.

The temperature in the reaction zone, in some instances, may be somewhat lower than the temperature at which the metal halide is vaporized. Under such conditions the metal halide may condense somewhat as a fog or smoke, which will be well dispersed within the carrier gas and reacts readily with the vaporized cyclopentadienyl component. It will be understood, therefore, that the reaction may be carried out with the metal halide being wholly vaporous or as vapor condensate, i.e. in the form of a fog or smoke which is well dispersed and hence that the term vapor includes the metal halide in the form of vapor condensate. The temperature in the reaction zone is an important and critical feature. Thus, if the temperature is too low, reaction will not occur, whereas when the temperature is too high, the organic compound, as cyclopentadiene, and similarly the organo-metallic compound produced, will be pyrolized and the desired product will not be obtained. Accordingly, the temperature at which vaporization is effected and the temperature in the reaction zone will vary depending upon the reacting materials and the manner in which the reaction is carried out, and it is desirable that these temperatures be sufficiently low to give effective vaporization and reaction.

The following table illustrates temperatures, and rates of flow of carrier gas which may be employed in the process of the present invention.

TABLE

*Operating Conditions for Preparation of Cyclopentadienyl-Metal Compounds*

| Reactants | Products | Vaporization Temperature, °C. | Reaction Temperature, °C. | Halide Carrier Gas, c.f.h. | Cyclopentadiene Carrier Gas c.f.h. |
|---|---|---|---|---|---|
| $FeCl_2+C_5H_6$ | $(C_5H_5)_2Fe$ | 700–875 | 300–560 | 4–8 | 3–4 |
| $FeCl_3+C_5H_6$ | $(C_5H_5)_2Fe$ | 250 | 400–535 | 8 | 1–4 |
| $NiCl_2+C_5H_6$ | $(C_5H_5)_2Ni$ | 725–875 | 185–325 | 4–12 | 1–8 |
| $CoCl_2+C_5H_6$ | $(C_5H_5)_2Co$ and $[(C_5H_5)_2Co]_2CoCl_4$ | 715–825 | 300–400 | 8–12 | 1.5–6 |
| $FeCl_2+CH_3-C_5H_5$ | $(CH_3-C_5H_4)_2Fe$ | 700 | 385–475 | 8 | 2–4 |

These conditions pertain when using a 1-in. I.D. McDanel tube in a Lindberg Globar furnace with an effective heating length of 8¾-in. The conditions, it will be realized, will vary somewhat when different reaction tubes and temperature gradients are used.

As an illustrative embodiment of a manner in which the invention may be practiced, the following examples are presented.

EXAMPLE I

The apparatus consisted of 1-in. I.D. McDanel tube heated in a Globar furnace. A charge of anhydrous $FeCl_2$ in a nickel boat was placed in the hottest part of the tube, i.e. the center of the heating zone, and the temperature of the $FeCl_2$, viz. the vaporization temperature, was measured by a thermocouple placed beneath the boat on the outside of the McDanel tube. A measured flow of a carrier gas, carrier gas I, e.g. argon, was blown over the $FeCl_2$ picking up the $FeCl_2$ vapor. The carrier gas+$FeCl_2$ passed to a cooler part of the McDanel tube where the $FeCl_2$ was present as a supercooled vapor and/or as a cloud of very finely divided particles. At a controlled temperature cyclopentadiene vapor in a carrier gas, carrier gas II, such as argon, was introduced into the carrier gas+$FeCl_2$ stream, suitably through a quartz lance. A thermocouple measured the temperature at which the carrier gas-cyclopentadiene stream entered. This temperature is the reaction temperature. The carrier gas II was saturated with cyclopentadiene vapor by bubbling it through the monomer at room temperature. The reaction products and carrier gas were passed from the McDanel tube, and the solid bis(cyclopentadienyl)iron and excess $FeCl_2$ were filtered from the gas stream by means of a bag filter as very finely divided powders.

The vaporization temperature for the $FeCl_2$ was 700° C. and a reaction temperature of 400–500° C. was employed. The carrier gas (argon) flows, measured in cubic feet per hour under normal conditions, were 8 c.f.h. for carrier gas I and 3 c.f.h. for carrier gas II. Bis(cyclopentadienyl)iron was produced.

The single pass recovery of bis(cyclopentadienyl)iron product amounted to a 68% yield based on the iron and a 5.2% yield based on the cyclopentadiene. The bis(cyclopentadienyl)iron (ferrocene) was separated from the excess $FeCl_2$ by recrystallizing from petroleum ether, and its identity was confirmed by chemical, infra-red and X-ray analyses.

EXAMPLE II

The process was conducted as described above in Example I, but substituting nitrogen for argon as carrier gases I and II. Bis(cyclopentadienyl)iron was produced also in good quantity.

EXAMPLE III $FeCl_3$ was vaporized at about 250° C. (Tv) in an 8 c.f.h. stream of argon, carrier gas I. A 4 c.f.h. stream of argon, carrier gas II, was saturated with cyclopentadiene by bubbling the gas stream through liquid cyclopentadiene at room temperature. These gas streams, each containing its respective carried vapor, are passed into a reaction zone maintained at a reaction temperature (Tr) of 535° C. Since the temperature of the reaction zone is greater than the volatilization temperature of $FeCl_3$ the latter was in the vapor state when contacted with the cyclopentadiene vapor. A bag-type filter was used to collect the product solids. The bis(cyclopentadienyl)iron thus produced may be separated from any excess of $FeCl_3$ by recrystallizing from petroleum ether, and its identity was confirmed by chemical analysis.

EXAMPLE IV

The process was conducted as in Example I. Nickel chloride was vaporized at a temperature of 850° C. in argon flowing at 8 c.f.h. and reacted with cyclopentadiene vapor at 250° C. in argon flowing at 2 c.f.h. with production of bis(cyclopentadienyl)nickel.

The green bis(cyclopentadienyl)nickel and excess

NiCl₂ were collected successfully in two different ways. (1) The solid materials were in very finely divided form which made the bis(cyclopentadienyl)nickel highly susceptible to decomposition when in contact with air. The powders were therefore filtered by a bag filter which was enclosed in a polyethylene bag with a small gas exit hole. This protected the bis(cyclopentadienyl)nickel from the air until it was separated from the NiCl₂ by dissolving in chloroform. (2) The exit gas with entrained bis(cyclopentadienyl)nickel +NiCl₂ was bubbled through petroleum ether which removed the solids from the gas stream. The bis(cyclopentadienyl)nickel was purified by crystallization and sublimation, and identified by chemical analysis.

EXAMPLE V

The process was conducted as described in Example I. Cobalt chloride was vaporized in argon flowing at 8 c.f.h. at a temperature of 750°–800° C. and reacted with cylopentadiene vapor in argon flowing at 3 c.f.h. and at 350° C. The final products of this reaction were: (1) black bis(cyclopentadienyl) cobalt and (2) green $$[(C_5H_5)_2Co]_2CoCl_4$$

The black $(C_5H_5)_2Co$ compound, however, is unstable in air and reacts with HCl and CoCl₂ to form the green, air-stable compound $[(C_5H_5)_2Co]_2CoCl_4$. The cobalt cyclopentadiene derivative was collected by means of a bag filter and also by scrubbing it out of the gas stream by bubbling through ethanol containing some conc. HCl. The $[(C_5H_5)_2Co]_2CoCl_4$ collected was identified by means of its infra-red absorption spectra.

EXAMPLE VI

The process was conducted as described in Example I. Ferrous chloride was vaporized at 690°–700° C. in argon flowing at 8 c.f.h. and reacted with methyl cyclopentadiene vapor in argon flowing at 4 c.f.h. and at a temperature of 400° C. Bis(methylcyclopentadienyl)iron was produced; recovered by bubbling through petroleum ether, and identified by chemical analysis.

The compounds produced in accordance with the invention herein described may be employed for various purposes, such as, for example, octane improvers in internal combustion engine fuels, as heat transfer agents, as coloring agents, as oil driers, as oxidation catalysts, and in the manufacture of rubber whereby there is obtained a high and increased state of cure which is evidenced by increased hardness, tensile strength and modulus, and lowered elongation, permanent set and compression set in the rubber product. More particularly, bis(cyclopentadienyl)nickel and bis(cyclopentadienyl)cobalt are utilizable in the hydrogenation especially of hydrogenatable organic compounds, e.g. toluene to methylcyclohexane; benzyl alcohol to tolene; phenol to cyclohexanol; acetone to isopropyl alcohol, and p-nitrophenol to p-aminophenol wherein they serve as source materials for catalytic nickel and cobalt, and as fully described in the co-pending application of Roy L. Pruett, Serial No. 511,429, filed May 26, 1955.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

1. A process for the production of organo-metallic compounds which comprises vaporizing a vaporizable halide of a 3d orbital series transition element, introducing the vapor into a reaction zone containing vapor of a cyclopentadiene having a reactive hydrogen on the methylene carbon atom and selected from the group consisting of cyclopentadiene, indene, and their lower alkyl, lower alkenyl, phenyl and benzyl derivatives, and maintained at between about 150° C. and about 600° C., and withdrawing organo-metallic reaction product from said reaction zone.

2. A process for the production of organo-metallic compounds which comprises vaporizing a vaporizable halide of a metal selected from the group consisting of iron, cobalt and nickel, introducing the vapor into a reaction zone containing vapor of a cyclopentadiene having a reactive hydrogen on the methylene carbon atom and selected from the group consisting of cyclopentadiene, indene, and their lower alkyl, lower alkenyl, phenyl and benzyl derivatives, and maintained at between about 150° C. and about 600° C., and withdrawing organo-metallic reaction product from said reaction zone.

3. A process for the production of organo-metallic compounds which comprises vaporizing a vaporizable halide of a 3d orbital series transition element in a stream of an inert carrier gas, introducing the stream of carrier gas containing produced vapor into a reaction zone containing vapor of a cyclopentadiene having a reactive hydrogen on the methylene carbon atom and selected from the group consisting of cyclopentadiene, indene, and their lower alkyl, lower alkenyl, phenyl and benzyl derivatives, and maintained at between about 150° C. and about 600° C., and withdrawing organo-metallic reaction product from said reaction zone.

4. A process for the production of organo-metallic compounds which comprises vaporizing a cyclopentadiene having a reactive hydrogen on the methylene carbon atom and selected from the group consisting of cyclopentadiene, indene, and their lower alkyl, lower alkenyl, phenyl and benzyl derivatives, in a stream of an inert carrier gas, vaporizing a vaporizable halide of a 3d orbital series transition element in a stream of an inert carrier gas, commingling the streams of carrier gas containing produced vapors in a reaction zone maintained at between about 150° C. and about 600° C., and withdrawing organo-metallic reaction product from said reaction zone.

5. A process for the production of organo-metallic compounds which comprises vaporizing a cyclopentadiene having a reactive hydrogen on the methylene carbon atom and selected from the group consisting of cyclopentadiene, indene, and their lower alkyl, lower alkenyl, phenyl and benzyl derivatives, vaporizing a vaporizable halide of a metal selected from the group consisting of iron, cobalt and nickel, commingling produced vapors in a reaction zone maintained at between about 150° C. and about 600° C. and withdrawing organo-metallic reaction product from said reaction zone.

6. A process as defined in claim 5, in which the cyclopentadiene is methyl cyclopentadiene.

7. A process as defined in claim 5, in which the cyclopentadiene is allyl cyclopentadiene.

8. A process as defined in claim 5, in which the cyclopentadiene is benzyl cyclopentadiene.

9. A process for the production of organo-metallic compounds which comprises vaporizing cyclopentadiene, vaporizing a vaporizable halide of a metal selected from the group consisting of iron, cobalt and nickel, commingling produced vapors in a reaction zone maintained at between about 150° C. and about 600° C. and withdrawing bis(cyclopentadienyl)metal compound containing reaction product from the reaction zone.

10. A process for the production of bis(cyclopentadienyl)iron which comprises vaporizing cyclopentadiene, vaporizing ferrous chloride, and commingling products thus obtained in a reaction zone maintained at between about 300° C. and about 560° C.

11. A process for the production of bis(cyclopentadienyl)iron which comprises vaporizing cyclopentadiene in a stream of argon, vaporizing ferrous chloride in a stream of argon at a temperature from about 700° to about 875° C., and commingling products thus obtained in a reaction zone at a temperature from about 300° to about 560° C.

12. A process for the production of organo-metallic compounds which comprises vaporizing a vaporizable halide of a metal selected from the group consisting of iron, cobalt and nickel, and introducing the vapor into a reaction zone maintained at between about 150° C. and about 600° C., containing vapor of indene.

References Cited in the file of this patent

UNITED STATES PATENTS 2,791,597     Anzilotti et al. ---------- May 7, 1957

OTHER REFERENCES

Birmingham et al.: Journ. Am. Chem. Soc., vol 76, p. 4179.

Handbook of Chemistry and Physics, Chemical Rubber Publ. Co., 30th ed., 1947, Table of Physical Constants of Inorganic Compounds.

Hackh's Chemical Dictionary, 3rd ed., Blakiston Co., Philadelphia, 1950, p. 30.

Wilkinson; Journ. Amer. Chem. Soc., vol. 76, Jan. 5, 1954, p. 209.